(12) United States Patent
Tung et al.

(10) Patent No.: US 7,533,566 B2
(45) Date of Patent: May 19, 2009

(54) FLUID MEASURING DEVICE (75) Inventors: Chun-Chin Tung, Chupei (TW);
Yung-Lieh Chien, Chupei (TW)

(73) Assignees: Syspotek Corporation, Chupei (TW);
Antig Technology Corporation, Grand Cayman (KY)

( * ) Notice: Subject to any disclaimer, the term of this patent is extended or adjusted under 35 U.S.C. 154(b) by 63 days.

(21) Appl. No.: 11/854,793

(22) Filed: Sep. 13, 2007

(65) Prior Publication Data

US 2008/0066544 A1 Mar. 20, 2008

(30) Foreign Application Priority Data

Sep. 18, 2006 (TW) .............................. 95134389 A (51) Int. Cl.
*G01F 23/26* (2006.01)
(52) U.S. Cl. ................ 73/290 B; 73/290 R; 73/304 C; 73/304 R; 324/658; 324/679
(58) Field of Classification Search ................ 73/30.01, 73/30.04, 31.05, 31.06, 149, 290 B, 290 R, 73/304 C, 304 R; 324/658, 679
See application file for complete search history.

(56) References Cited

U.S. PATENT DOCUMENTS

| 4,259,865 A | * | 4/1981 | Myers ...................... 73/304 C |
| 4,347,740 A | * | 9/1982 | Townsend .................. 73/304 C |
| 4,515,015 A | * | 5/1985 | Kuhlman ................... 73/304 C |
| 4,525,792 A | * | 6/1985 | Clinton ....................... 702/52 |
| 4,628,302 A | * | 12/1986 | Barr et al. .................... 340/620 |
| 4,720,997 A | * | 1/1988 | Doak et al. .................... 73/295 |
| 5,017,909 A | * | 5/1991 | Goekler ...................... 340/620 |
| 5,033,300 A | * | 7/1991 | Matsuo et al. ............ 73/304 R |
| 5,042,299 A | * | 8/1991 | Wells ........................ 73/304 C |
| 5,077,527 A | * | 12/1991 | Patriquin ..................... 324/660 |
| 5,182,545 A | * | 1/1993 | Goekler et al. .............. 340/620 |
| 5,532,527 A | * | 7/1996 | Zatler et al. ................. 307/118 |
| 5,553,479 A | * | 9/1996 | Rauchwerger .............. 73/1.73 |
| 5,554,937 A | * | 9/1996 | Sanders et al. .............. 324/664 |
| 6,362,632 B1 | * | 3/2002 | Livingston ................... 324/661 |
| 2007/0000320 A1 | * | 1/2007 | Jaeger et al. .............. 73/304 C |

* cited by examiner

*Primary Examiner*—David A. Rogers (57) ABSTRACT

A fluid measuring device for use in a fluid storage tank, comprising a logic operation unit, a capacitive sensor, and a capacitance sensing circuit; wherein the capacitance sensing circuit is driven by the constant current input to perform the detection of the capacitance value of the capacitive sensor, then perform the conversion from the capacitance value into the signal on the physical characteristics of the fluid body by the logic operation unit. The signal on the physical characteristics can include any of the concentration, density, and surface level of the fluid body. Furthermore, the capacitive sensor can further comprise a reference capacitor and a detection capacitor for detecting the fluid, the latter capacitance is obtained from a differential circuit of the capacitance sensing circuit.

23 Claims, 10 Drawing Sheets

FLUID MEASURING DEVICE

FIELD OF THE INVENTION

The present invention relates to a fluid measuring device, more particularly, to a fluid sensing circuit with capacitive sensors to measure the physical characteristics of fluids in a fluid tank.

BACKGROUND OF THE INVENTION

Conventional fluid measuring devices are used for measuring the physical characteristics of a fluid body, for example the concentration of the fluid, density, or the total volume. Most common fluid measuring devices are complicated in design and bulky in size, and as a result will raise the overall cost for the device. Therefore, devices that are compact in size and low in cost are gaining an important place on the market due to increased demands, such as the fuel cell system that is becoming increasingly popular in portable electronic devices that uses hydrogen-rich fluid fuel (such as methanol) and oxygen fluid fuel that result in an electrochemical reaction to output electric power. In such fuel cell systems, information on the remaining fluid fuel or when the fluid concentration drops to an insufficient level has to be relayed to the user for refilling of the fluid fuel; therefore the system has to be able to detect the fluid level or capacity inside the container tank. Sensors used for measurement in most common fluid fuel containers that provide detection of the fluid concentration and the remaining level are expensive. Their massive applications in portable electronic devices are hence not economical.

Therefore, the present invention provides a fluid measuring device to resolve the problems of conventional devices for measuring the physical characteristics of fluid bodies and apparatus thereof.

SUMMARY OF THE INVENTION

The object of the present invention is to provide a fluid measuring device for measuring the concentration, density, surface level, or other physical characteristics of the fluid body.

Another object of the present invention is to provide a fluid measuring device is applicable to a fuel cell system to measure the fluid fuel concentration, fluid fuel density, fluid fuel surface level, or other physical characteristics of the fluid fuel in the fuel cell system.

Another object of the present invention is to provide a fluid measuring device, wherein the sensor placed within the fluid body is used as the measurement apparatus, and the capacitive sensor detects the changes in electrical characteristics and then the fluid measuring device converts the electrical characteristics into the physical measurements required for the algorithm; thereby obtaining the physical characteristics of the fluid body.

Yet another object of the present invention is to provide a fluid measuring device that can provide a reference electrical signal to calibrate the deviations caused by the electrochemical byproducts or variations in temperature from flow of the fluid body.

To achieve the above-mentioned objects, the present invention provides a fluid measuring device disposed within a fuel storage tank, comprises a logic operation unit, a capacitive sensor, and a capacitance sensing circuit; wherein the capacitance sensing circuit detects the capacitance value of capacitive sensor through the input of the constant current, and initiates the charge state on capacitive sensor through the logic operation unit, and then activates the time accumulator until the voltage across the capacitive sensor reaches a reference voltage level. The logic operation unit receives the time difference between the time to activate/recharge and the time to reach the reference voltage level for the logic operation unit to calculate the capacitance value of the capacitive sensor. Finally, the logic operation unit performs the back-stage algorithm to convert the capacitance value into the physical characteristic information of the fluid body, wherein the physical characteristic information can include any one of the concentration, density, and surface level of the fluid body.

Furthermore, the capacitive sensor can further comprise a reference capacitor and a detection capacitor for detecting the fluid, the latter capacitance is obtained from a differential circuit of the capacitance sensing circuit.

Moreover, the fluid measuring device can be disposed within the fluid fuel tank of a fuel cell system to measure the concentration, density, surface level, or other physical characteristics of the fluid body inside the fuel tank.

The following embodiments and figures are provided in detail for those who are well versed in the related art for understanding of the goals, features, and intended effects of the present invention.

DETAILED DESCRIPTION OF THE INVENTION

Figure 1:
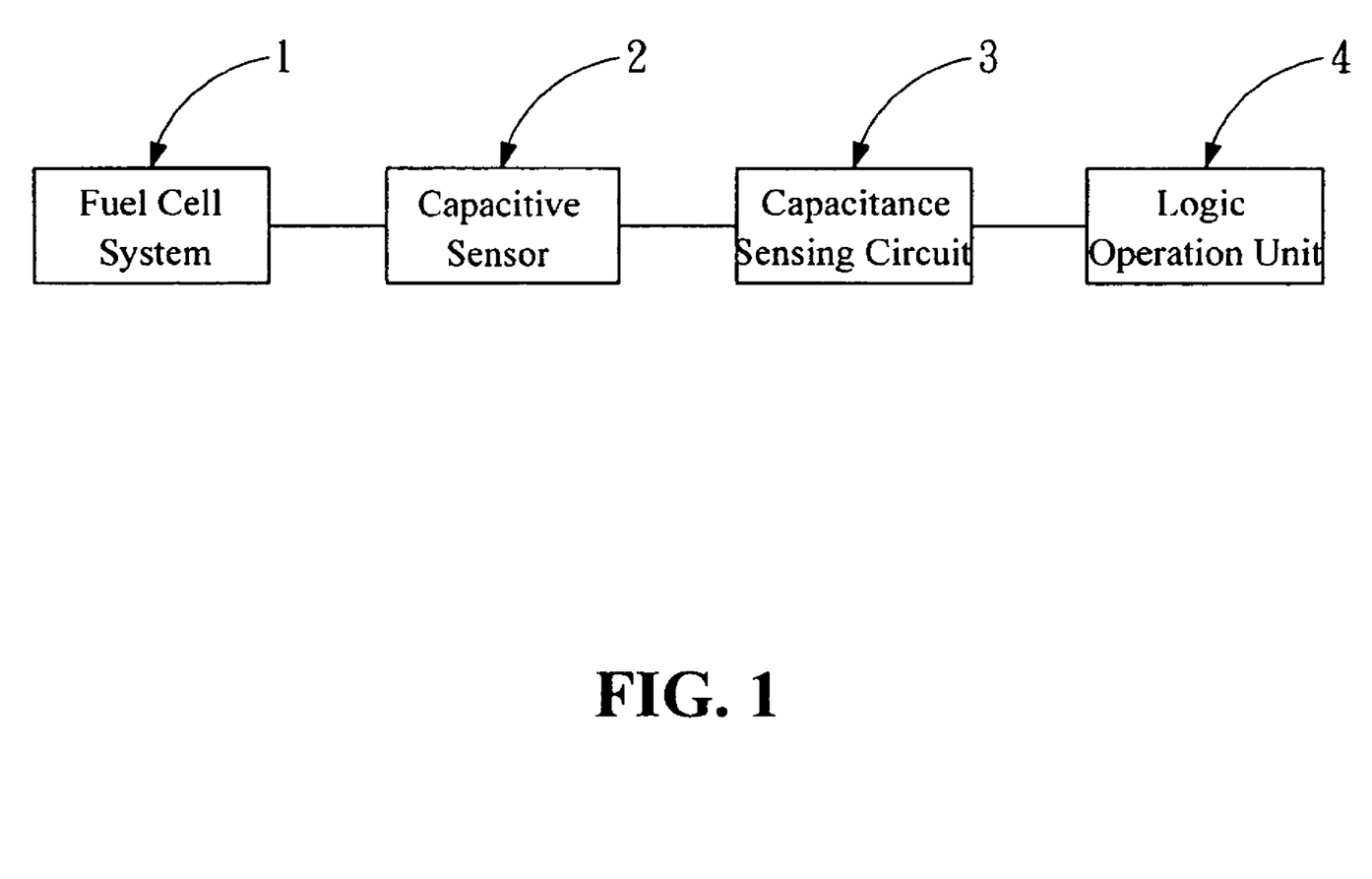
FIG. 1 is the block diagram for the components of the fluid measuring device according to the present invention.

Referring to FIG. 1, there is illustrated the block diagram for the components of the fluid measuring device according to the present invention. As the embodiment of the present invention the fluid measuring device for use in a fuel cell system (1) comprises a capacitive sensor (2), a capacitance sensing circuit (3), and a logic operation unit (4) in the fuel cell system, wherein the capacitive sensor (2) generates the corresponding electrical signal in response to the fluid fuel level in the fuel cell system (1) and then the capacitance sensing circuit (3) converts the corresponding electrical signal into an electrical signal in association with capacitance values; the logic operation unit (4) performs the back-stage algorithm on the electrical signal in association with capacitance values.

Figure 2:
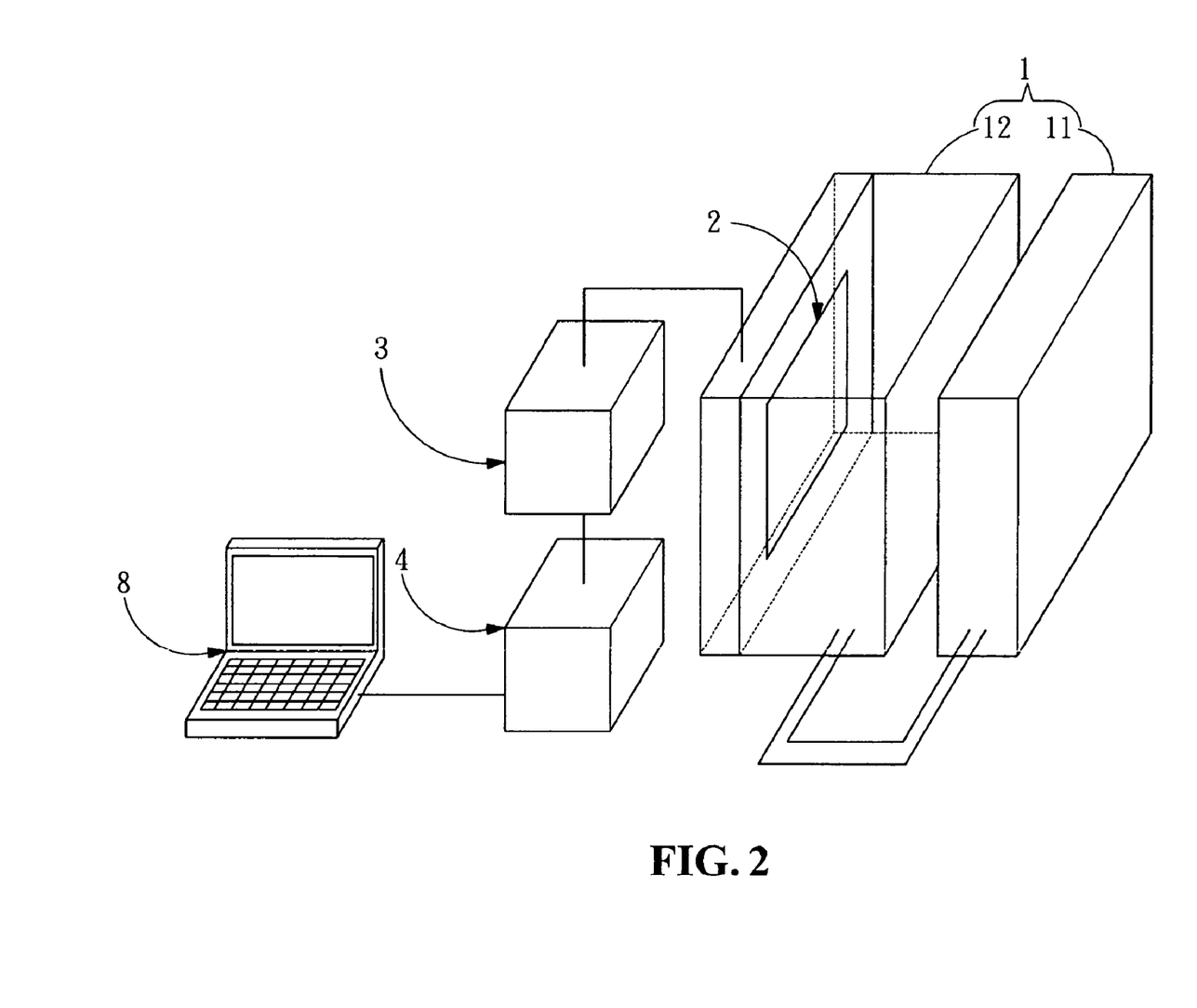
FIG. 2 is the 3D diagram of the first embodiment of the fluid measuring device.

Referring to FIG. 2, there is illustrated the 3D diagram of the embodiment for the fluid measuring device according to the present invention. In the embodiment where the fluid measuring device is used in the fuel cell system, the fuel cell system (1) further comprises at least one power generation member (11) and at least one fluid fuel tank (12), wherein the power generation member (11) contains catalyzing materials that can result in electrochemical reactions to the hydrogen-rich fluid fuel and the oxygen fluid fuel, thereby converting chemical energy into electrical energy as a type of energy converter; and the fluid fuel tank (12) can store the fuel required by the electrochemical reactions of the power generation member (11), and has a transporting means for supplying the fluid fuel to the power generation member (11). Furthermore, the capacitive sensor (2) is disposed within the fluid fuel tank (12) of the fuel cell system (1) to generate the corresponding electrical signal in response to the fluid fuel surface level inside the fluid fuel tank (12); wherein the capacitive sensor (2) is electrically connected to the capacitance sensing circuit (3) so that the capacitance sensing circuit (3) converts this electrical signal into an electrical signal in association with capacitance values, and the capacitance sensing circuit (3) is electrically connected to the logic operation unit (4) so that the logic operation unit (4) converts this electrical signal in association with capacitance values into the fluid fuel surface level information.

Furthermore, the logic operation unit (4) converts the electrical signal in association with capacitance values into the fluid fuel surface level information, whereby the fluid fuel surface level information can be further output as an image to be displayed on a display device (8). For example, the display device (8) is a notebook computer and the logic operation unit (4) is electrically connected to a signal I/O port on the display device (8), and the fluid fuel surface level information is transferred to the notebook computer for output to the display device (8) by means of images, text, or any other format thereby providing the user with the ability to monitor the remaining fluid fuel level or battery power of the fuel cell system.

Figure 3:
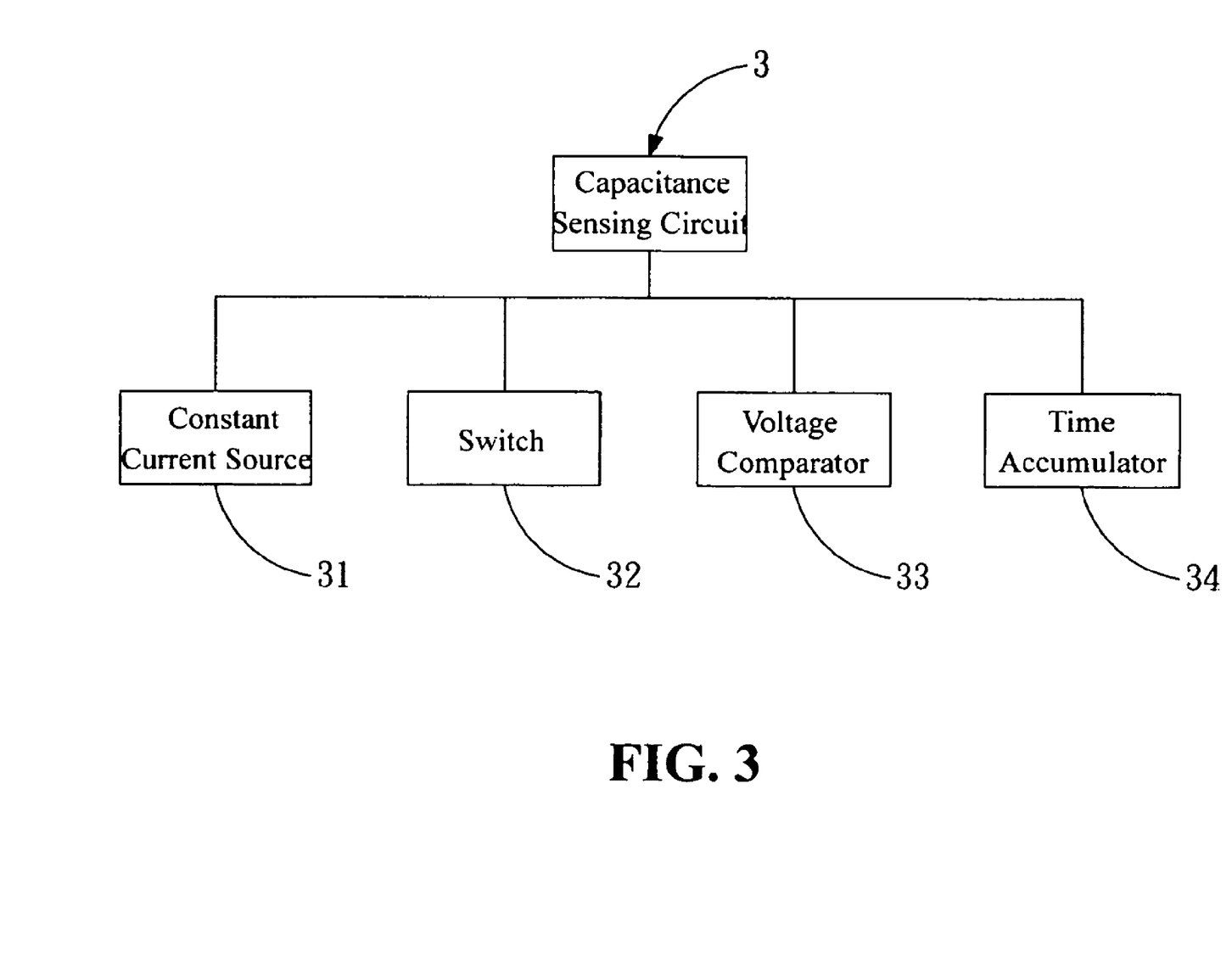
FIG. 3 is the block diagram for a portion of the components of the fluid measuring device.

Referring to FIG. 3, there is illustrated the block diagram for a portion of the components of the fluid measuring device according to the present invention. As shown in FIG. 3, one embodiment of the above-mentioned capacitance sensing circuit (3) comprises a constant current source (31), a switch (32), a voltage comparator (33), and a time calculator (34), wherein the constant current source (31) is an active component that provides a constant current signal output; the switch (32) selects the direction of the current signal from the constant current source (31) in the circuit; the voltage comparator (33) is a signal comparison unit that compares the signal voltage with a reference voltage, the potential of the signal voltage output from the voltage comparator (33) is from negative to positive when the signal voltage input into the voltage comparator (33) is higher than the reference voltage; and the time calculator (34) is used to calculate the time difference between the instance when the input signal from the switch (32) drops from high potential to low potential, and the instance when the output signal from the voltage comparator (33) rises from low potential to high potential. Therefore, when the switch (32) selects the direction of the constant current source (31) to charge the capacitive sensor (2), the time calculator (34) will clear the time record from previous stage and the voltage across the capacitive sensor (2) will continuously increase until the voltage exceeds to the reference level of the voltage comparator (33), at that moment the time calculator (34) will stop the time accumulation. Subsequently, the logic operation unit (4) can capture the accumulated time from the time calculator (34) for the capacitance sensing circuit (3) and calculate the capacitance of the capacitive sensor (2) with the proportional relationship between the capacitance and the charge time.

The capacitance sensing circuit (3) and logic operation unit (4) can be integrated into the form of a general-purpose circuit or an IC circuit.

Figure 4:
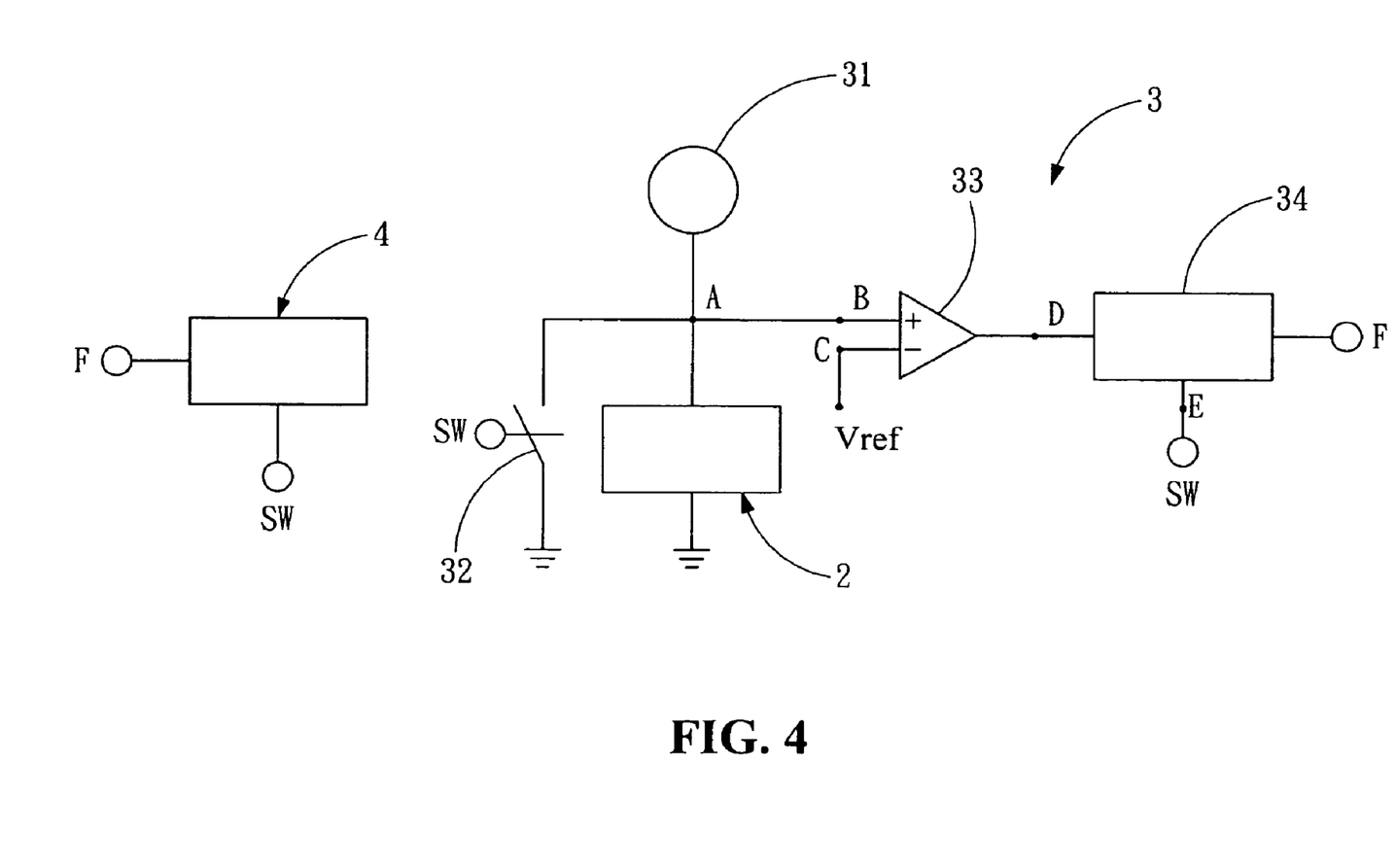
FIG. 4 is the circuit diagram for a portion of the components of the fluid measuring device.
Figure 5:
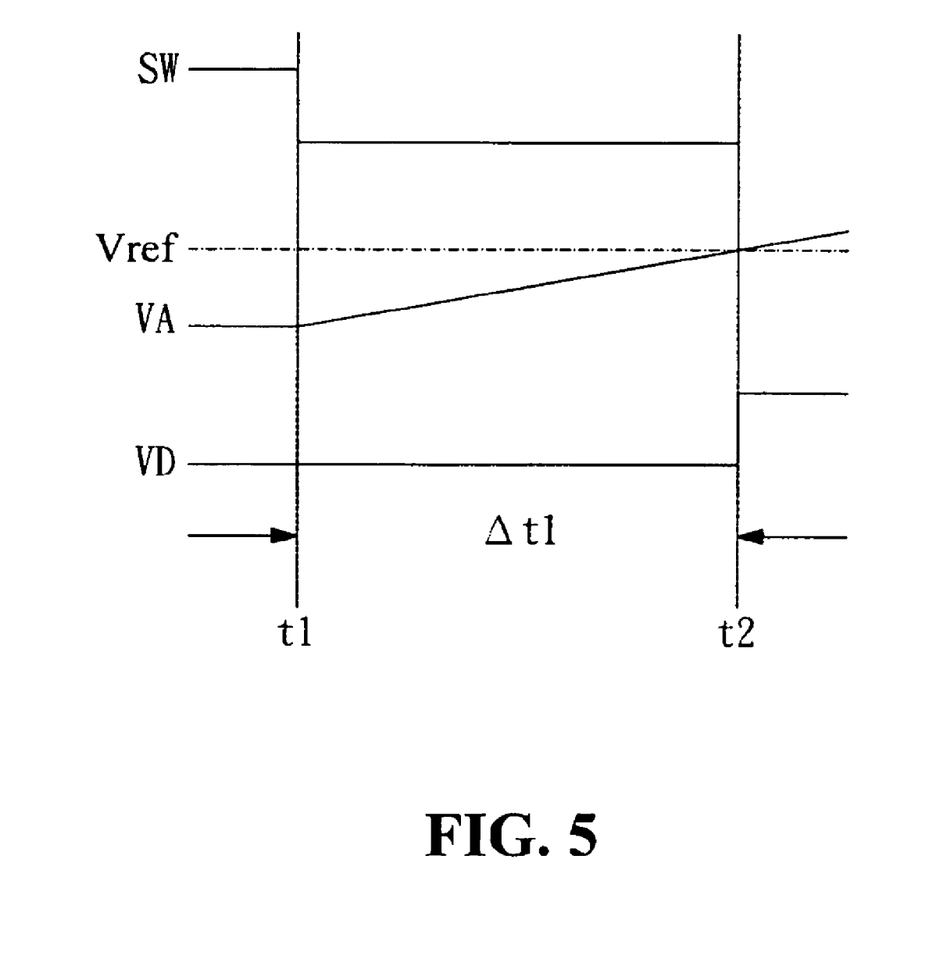
FIG. 5 is the signal output waveform of FIG. 4.

Referring to FIG. 4 and FIG. 5, there are illustrated the circuit diagram and the signal output waveform graph for a portion of the components of the fluid measuring device according to the present invention. As shown in FIG. 4, in the capacitance sensing circuit (3), the constant current source (31) is electrically connected to a first electrical contact (A), and is then electrically connected to the switch (32), capacitive sensor (2), and voltage comparator (33) respectively through the first electrical contact (A). The logic operation unit (4) has a switching signal output port (SW) and an electrical signal input port electrically connected to a sixth electrical contact (F), and is then electrically connected to the time calculator (34) and the control terminal on the switch (32) through the switching signal output port (SW), to provide the logic operation unit (4) for outputting the control signal to the switch (32) and the time calculator (34). The switch (32) and capacitive sensor (2) are electrically connected in parallel. The voltage comparator (33) has a second electrical contact (B), a third electrical contact (C), and a fourth electrical contact (D) for providing electrical connections, and is electrically connected to the first electrical contact (A) through the second electrical contact (B), electrically connected to a reference voltage (Vref) through the third electrical contact (C), and electrically connected to the time calculator (34) through the fourth electrical contact (D), so as the second electrical contact (B) acting as the high potential input port and the third electrical contact (C) acting as the low potential input port. When the potential of the input signal of the second electrical contact (B) is higher than the electrical signal of the third electrical contact (C), the output electrical signal of the fourth electrical contact (D) will rise from negative potential to positive potential and be transmitted to the time calculator (34). The time calculator (34) has the fourth electrical contact (D), fifth electrical contact (E), and sixth electrical contact (F) for providing electrical connections, and is electrically connected to the voltage comparator (33) through the fourth electrical contact (D), electrically connected to the switching signal output port (SW) on the logic operation unit (4) through the fifth electrical contact (E), and electrically connected to the electrical signal input port on the logic operation unit (4) through the sixth electrical contact (F) for outputting the electrical signal of the time calculator (34) to the logic operation unit (4). As shown in FIG. 5, the switching signal output port (SW) of the logic operation unit (4) will output a logic high signal in the initial state, and the switch (32) will turn on to discharge the electric charges stored on the capacitive sensor (2) thereby to initialize the capacitance level of the capacitive sensor (2). At time t1, the switching signal output port (SW) of the logic operation unit (4) inputs a logic low signal to turn off the switch (32), and the time calculator (34) will clear the accumulated time which has been recording to restart the time accumulation, enabling the constant current source (31) of the capacitance sensing circuit (3) to supply a constant current to charge the capacitive sensor (2), as a result raising the voltage (VA) on the first electrical contact (A) to approach the reference voltage (Vref) of the voltage comparator (33). Subsequently, at time t2, the accumulated charges on the capacitive sensor (2) will raise the voltage (VA) over the reference voltage (Vref) and hence the output voltage (VD) of the fourth electrical contact (D) of the voltage comparator (33) rise from negative potential to positive potential, and is then sent to the time calculator (34) to stop the time accumulation and result in a time difference (Δt1) between time (t1) and time (t2). Finally, the time difference (Δt1) electrical signal is sent to the logic operation unit (4) through the sixth electrical contact (F) when the time calculator (34) stops the time accumulation, thereby the logic operation unit (4) can calculate the capacitance value of the capacitive sensor (2) and perform the back-stage algorithm on the logic operation unit (4).

The back stage algorithm of the logic operation unit (4) comprises performing calculation on the capacitance value to obtain the concentration, surface level, density, and any other physical characteristics of the fluid fuel.

Figure 6:
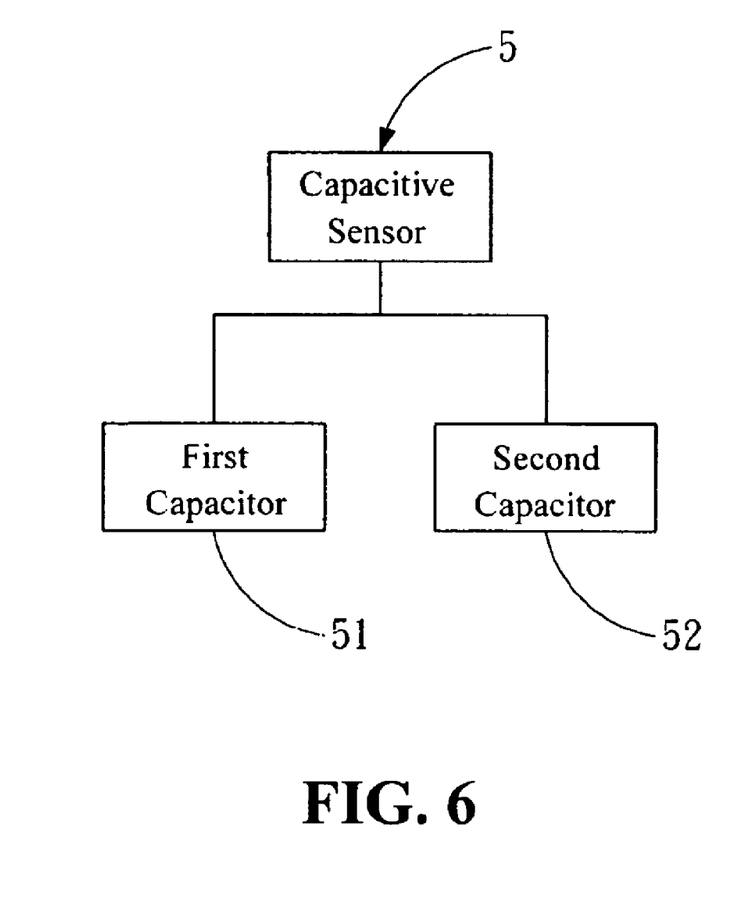
FIG. 6 is the block diagram of the second embodiment for a portion of the components of the fluid measuring device.
Figure 7:
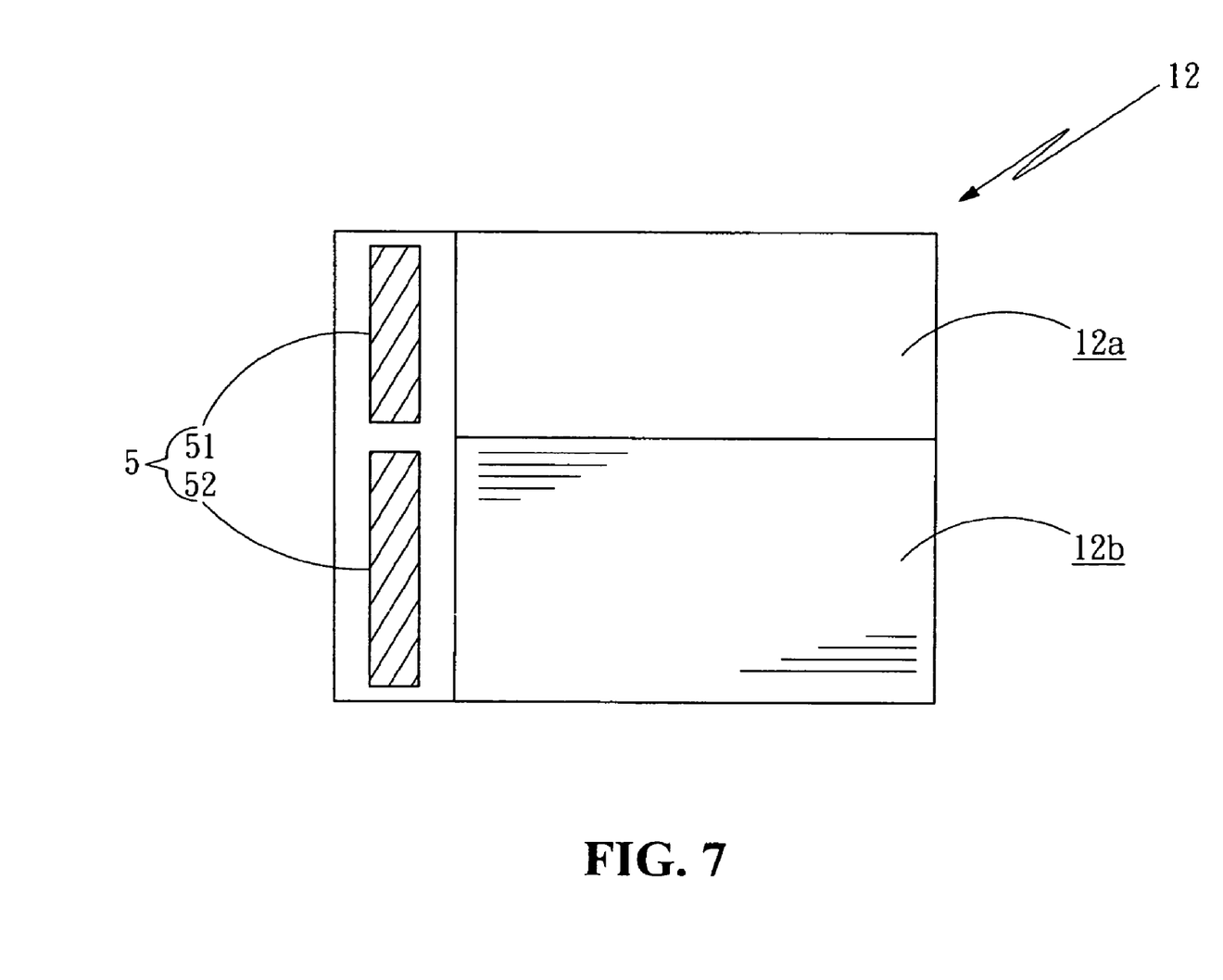
FIG. 7 is the cross-section diagram for a portion of the components of the second embodiment from FIG. 6.

Referring to FIG. 6 and FIG. 7, there are illustrated the block diagram for a portion of the components of the second embodiment of the fluid measuring device according to the present invention, and the cross-section diagram for a portion of the components of the second embodiment of FIG. 6. As shown in FIG. 6, the difference between this embodiment and the above-mentioned embodiment is that the fluid measuring device has an additional capacitive sensor (5), the capacitive sensor (5) having a first capacitor (51) and second capacitor (52). As further shown in FIG. 7, the first capacitor (51) and second capacitor (52) on the capacitive sensor (5) are configured to dispose in the fluid fuel tank (12) in a specific size ratio; wherein the configuration of the second capacitor (52) corresponds to the fluid fuel in the fluid fuel tank (12), and the first capacitor (51) should avoid direct contact to the fluid fuel in the fluid fuel tank (12). The first capacitor (51) is provided to correspond to an accommodation space (12a), where the accommodation space (12a) can be a locally enclosed space in the fluid fuel tank (12) and does not store any fluid fuel; while the second capacitor (52) corresponds to the fluid fuel storage portion (12b) in the fluid fuel tank (12). The objective is to use the capacitance value from the first capacitor (51) as the reference capacitance in the absence of fluid, and the second capacitor (52) can then use the measured capacitance from the first capacitor (51) by proportion and set the resulting value as the initial capacitance in the absence of fluid, and based on which, the capacitance of the second capacitor (52) is referenced to the amount of fluid fuel in the fluid fuel storage portion (12b) to obtain the fluid fuel surface level of the fluid fuel storage portion (12b).

Figure 8:
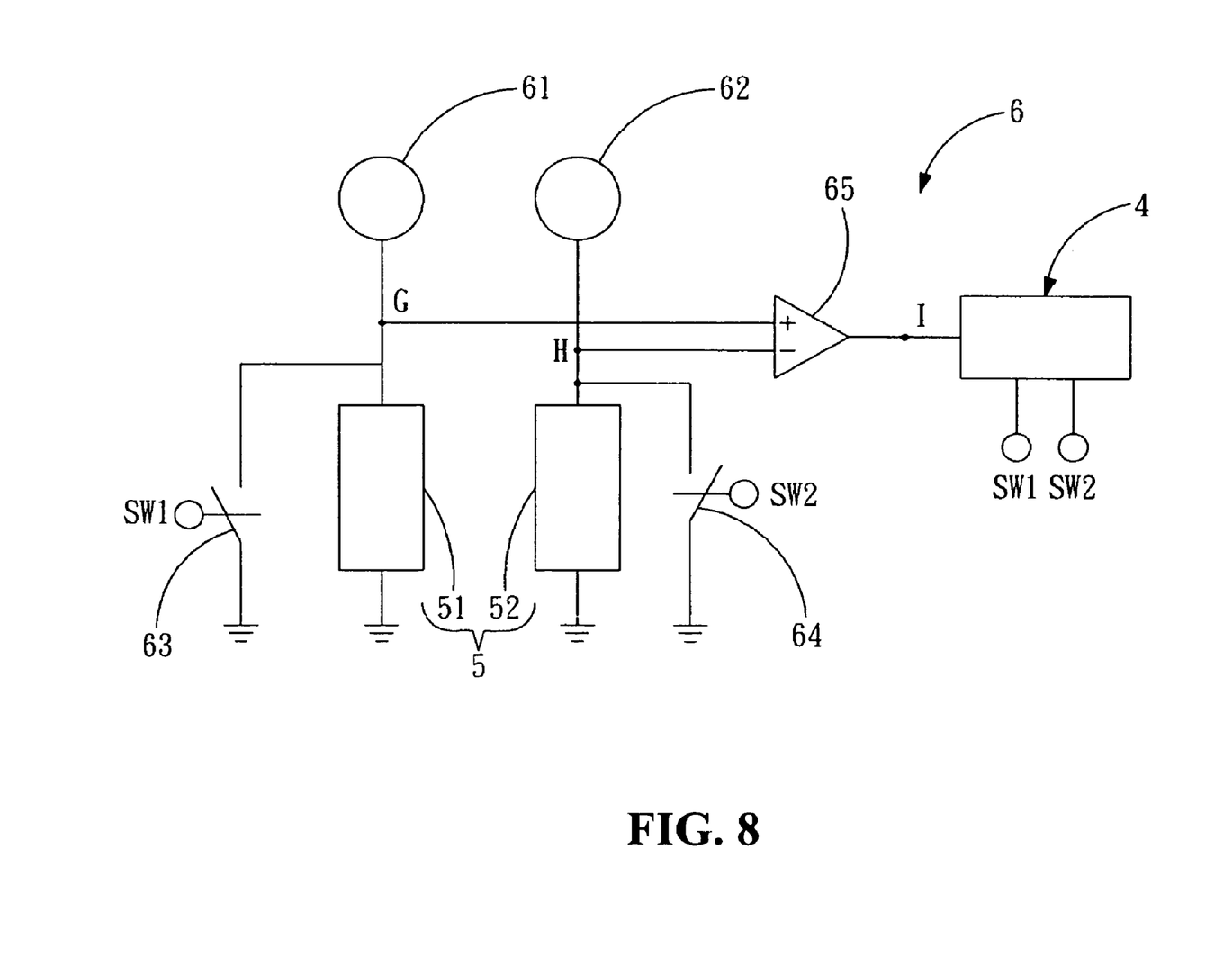
FIG. 8 is the circuit diagram for a portion of the components of the fluid measuring device.
Figure 9:
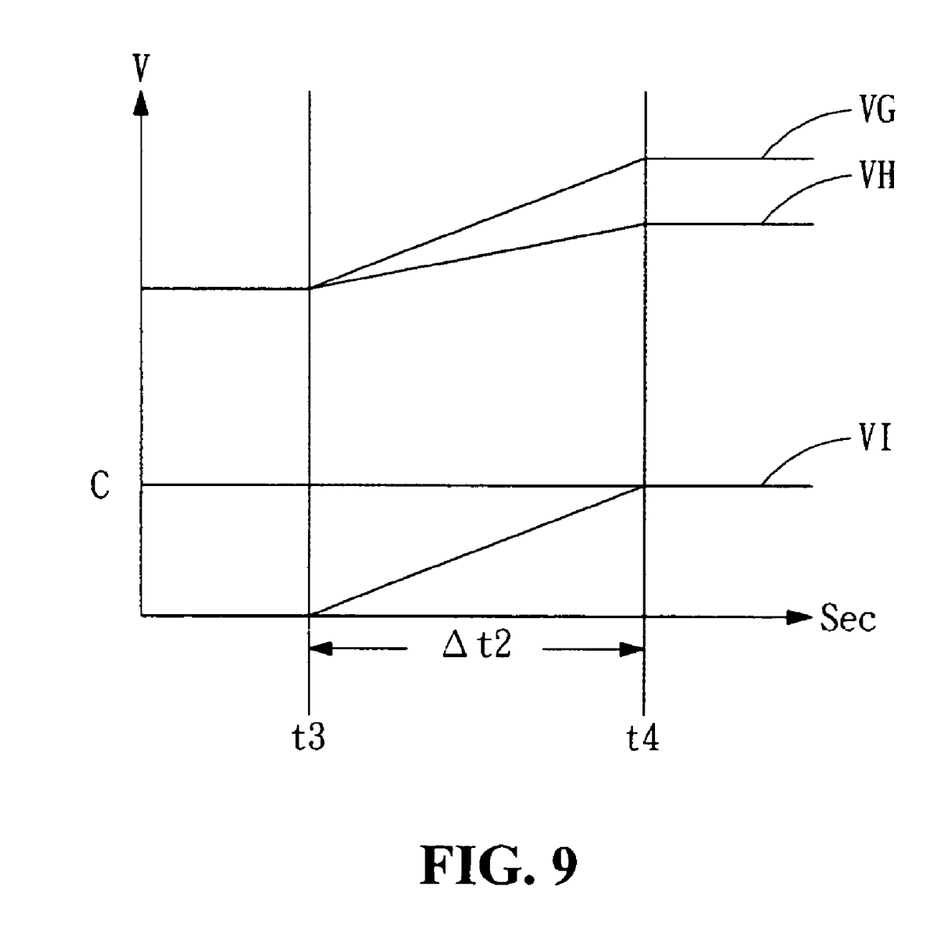
FIG. 9 is the signal output waveform of FIG. 8.

Referring to FIG. 8 and FIG. 9, there are illustrated the circuit diagram and the signal output waveform graph for a portion of the components of the fluid measuring device according to the present invention. According to the second embodiment, the fluid measuring device as shown in FIG. 8 further comprises a capacitance sensing circuit (6) in which a constant current source (61) being electrically connected to a seventh electrical contact (G) and then electrically connected to a first switch (63) and the first capacitor (51) respectively through the seventh electrical contact (G), another constant current source (62) being electrically connected to an eighth electrical contact (H) and then electrically connected to a second switch (64) and the second capacitor (52) respectively through the eighth electrical contact (H). The seventh electrical contact (G) and the eighth electrical contact (H) are electrically connected to the high potential input port and the low potential input port of a voltage differential amplifier (65) respectively. The amount of output currents from the constant current source (61) and constant current source (62) are proportional to the capacitance values of the first capacitor (51) and the second capacitor (52) in the absence of fluid output to the seventh electrical contact (G) and eighth electrical contact (H). The logic operation unit (4) has a first switching signal output port (SW1) and a second switching signal output port (SW2), wherein the first switching signal output port (SW1) and second switching signal output port (SW2) are electrically connected to the control terminals of the first switch (63) and the second switch (64), enabling the logic operation unit (4) to output the control signal to the first switching signal output port (SW1) and second switching signal output port (SW2). The signal output port of the voltage differential amplifier (65) is electrically connected to a ninth electrical contact (I) and then electrically connected to the logic operation unit (4) through the ninth electrical contact (I). When the electrical signals of voltage (VG) and voltage (VH) are input to the seventh electrical contact (G) and the eighth electrical contact (H) respectively, the ninth electrical contact (I) will output a differential voltage signal (V1) to the logic operation unit (4); where the gain from the differential voltage signal (V1) is proportional to the differential gain between the voltage (VG) and voltage (VH). As shown in FIG. 9, at time t3 the first switching signal output port (SW1) and second switching signal output port (SW2) of the logic operation unit (4) will turn off the first switch (63) and second switch (64), and the logic operation unit (4) will clear the time record to restart the time accumulation, enabling the first capacitor (51) and second capacitor (52) to be continuously charged and raising the voltage (VG) on the seventh electrical contact (G) and the voltage (VH) on the eighth electrical contact (H). Furthermore, when the voltage (VG) and voltage (VH) reaches saturation at time t4, the differential voltage (V1) between the voltage (VG) and voltage (VH) will remain a constant, enabling the logic operation unit (4) to stop the time calculator to obtain the time difference (Δt2) between time (t3) and time (t4). Last of all, when the logic operation unit (4) stops time accumulation, the logic operation unit (4) will calculate the capacitance value of the second capacitor (52) according to the time difference (Δt2) and the capacitance of the first capacitor (51), then perform the back stage algorithm.

Figure 10:
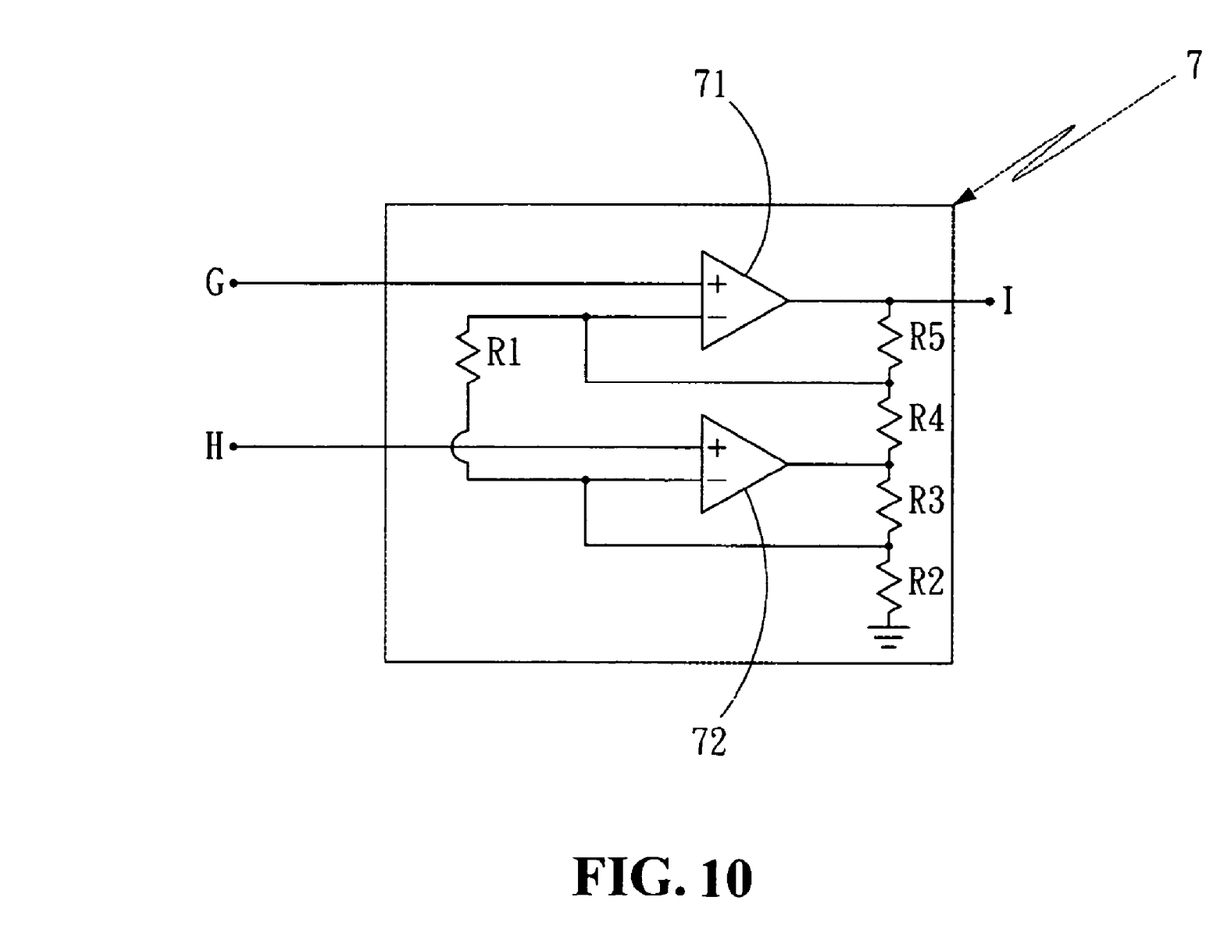
FIG. 10 is the circuit diagram for a portion of the components of the fluid measuring device.

Referring to FIG. 10, there is illustrated the circuit diagram for a portion of the components of the fluid measuring device according to the present invention. In the embodiment of the circuit as shown in FIG. 8, the voltage differential amplifier (65) can be consisted of a voltage comparison circuit means (7) including a first comparator (71), a second comparator (72), a first resistor (R1), a second resistor (R2), a third resistor (R3), a fourth resistor (R4), and a fifth resistor (R5). The seventh electrical contact (G) is electrically connected to the high potential port on the first comparator (71), and the eighth electrical contact (H) is electrically connected to the high potential port on the second comparator (72); the signal output port of the first comparator (71) is electrically connected to the ninth electrical contact (I); the low potential port on the first comparator (71), the first resistor (R1), and the low potential port on the second comparator (72) are electrically connected in series. One terminal of the second resistor (R2) is a ground terminal and another terminal is electrically connected to the low potential port on the second comparator (72), one terminal of the third resistor (R3) is electrically connected to the low potential port on the second comparator (72) and another terminal is electrically connected to the signal output port on the second comparator, one terminal of the fourth resistor (R4) is electrically connected to the signal output port on the second comparator (72) and another terminal is electrically connected to the grounded low potential port on the first comparator (71), one terminal of the fifth resistor (R5) is electrically connected to the low potential port on the first comparator (71) and another terminal is electrically connected to the signal output port on the first comparator (71). Therefore, in the FIG. 9, the gain difference between the voltage (VG) across the seventh electrical contact (G) and the voltage (VH) across the eighth electrical contact (H) will be amplified.

Even though the above-mentioned embodiment uses the fuel cell system as example, the fluid measuring device of the present invention can also be utilized to measure various fluid bodies that are applicable.

While the present invention has been described by way of example and in terms of preferred embodiment, it is to be understood that the invention is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A fluid measuring device, comprising:
    a logic operation unit with a switching signal output port for outputting a control signal;
    a capacitive sensor for generating a corresponding electrical signal in response to at least one physical property of a body of fluid; and
    a capacitance sensing circuit, comprising:
        a constant current source including a constant current source output electrical contact for outputting an electrical signal of the constant current source;
        a switch including a control terminal, a signal input port, and a signal output port;
        a voltage comparator including a high potential input port, a low potential input port, and signal output port, wherein the potential of the low potential input port is a reference voltage; and
        a time calculator for accumulating the time of the signal output from the voltage comparator, comprising:
            an electrical contact forming an electrical connection with the signal output port of the voltage comparator;
            another electrical contact forming another electrical connection with the switching signal output port of the logic operation unit; and
            a further electrical contact for outputting the accumulated time to the logic operation unit in the form of an electrical signal;
        wherein the constant current source is electrically connected to the signal input port of the switch, the capacitive sensor, and the high potential input port of the voltage comparator respectively through the constant current source output electrical contact; and
    the other terminals of the switch and the capacitive sensor are connected to ground, resulting in the electrical connection of the switch and the capacitive sensor in parallel.

2. The fluid measuring device as claimed in claim 1, wherein:
    in an initial state, the switching signal output port of the logic operation unit outputs a logic high signal to turn on the signal input port and signal output port of the switch, thereby discharging the capacitive sensor;
    after a first stage in time, the switching signal output port of the logic operation unit outputs a signal to turn off the signal input port and signal output port of the switch, at the same time the switching signal output port of the logic operation unit outputs another signal to clear the accumulated time record in the time calculator to restart the time accumulation, enabling under the constant current source of the capacitance sensing circuit continuously to input the signal the capacitive sensor will be constantly charged and rise the voltage of the first electrical contact to approach the reference voltage of the voltage comparator;
    after a second stage in time, the voltage across the capacitive sensor exceeds the reference voltage and raises the output voltage of the signal output port of the voltage comparator from negative potential to positive potential then sent to the time calculator, enabling the time calculator to stop accumulating the time and hence obtain the time difference between the time at first stage and second stage; and
    at the same time when the time calculator stops the time accumulation, the time difference electrical signal is sent to the logic operation unit as the corresponding physical information derived from the time difference.

3. The fluid measuring device as claimed in claim 2, wherein:
    the logic operation unit further comprises performing a back stage algorithm on the capacitance of the capacitive sensor in order to obtain the at least one physical property of the body of fluid; and
    the at least one physical property is selected from one of the concentration, density, and surface level of the body of fluid.

4. The fluid measuring device as claimed in claim 1, wherein the capacitance sensing circuit and the logic operation unit can be integrated in the form of either an electrical circuit or an integrated circuit (IC).

5. The fluid measuring device as claimed in claim 1, wherein the switch is selected from one of a MOS switch or transistor switch.

6. The fluid measuring device as claimed in claim 1, wherein the capacitive sensor is disposed within a fluid fuel tank of a fuel cell system, where the fluid fuel tank contains the fluid fuel and the capacitive sensor is used to detect the at least one physical property of the fluid fuel to generate the corresponding electrical signal.

7. The fluid measuring device as claimed in claim 6, wherein:
    in an initial state, the switching signal output port of the logic operation unit outputs a logic high signal to turn on the signal input port and signal output port of the switch, thereby discharging the capacitive sensor;
    after a first stage in time, the switching signal output port of the logic operation unit outputs a signal to turn off the signal input port and signal output port of the switch, at the same time the switching signal output port of the logic operation unit outputs another signal to clear the accumulated time record in the time calculator to restart the time accumulation, enabling under the constant current source of the capacitance sensing circuit continuously to input the signal the capacitive sensor will be constantly charged and rise the voltage of the first electrical contact to approach the reference voltage of the voltage comparator;
    after a second stage in time, the voltage across the capacitive sensor exceeds the reference voltage, enabling the signal output port of the voltage comparator to output a voltage signal to the time calculator and hence the time calculator stops accumulating the time to obtain the time difference between the time at first stage and second stage; and
    at the same time when the time calculator stops the time accumulation, the time difference electrical signal is sent to the logic operation unit as the corresponding physical information derived from the time difference.

8. The fluid measuring device as claimed in claim 7, wherein:
the logic operation unit further comprises performing a back stage algorithm on the capacitance of the capacitive sensor to obtain the at least one physical property of the body of fluid; and
the at least one physical property is selected from one of the concentration, density, and surface level of the body of fluid.

9. The fluid measuring device as claimed in claim 1, wherein:
the logic operation unit converts the electrical signal from the capacitor into the surface level information of the fluid fuel; and
the surface level information of the fluid fuel can be further output as image data to be displayed on a display device.

10. The fluid measuring device as claimed in claim 9, wherein:
the display device is a computer system, and the logic operation unit is electrically connected to a signal I/O port of the computer system; and
the surface level information of the fluid fuel is sent to the computer system to be displayed as image or text format on the display device in order to allow a user to monitor the remaining fluid fuel level of the fuel cell system.

11. A fluid measuring device, comprising:
a logic operation unit with a first switching signal output port and a second switching signal output port for outputting a respective control signal;
a capacitive sensor consisting of a first capacitor and second capacitor, where the capacitors respectively respond to the surrounding materials and result in the corresponding capacitive characteristics; and
a capacitance sensing circuit, comprising:
a first constant current source including a first constant current source output electrical contact for outputting an electrical signal of the constant current source;
a second constant current source including a second constant current source output electrical contact for outputting an electrical signal of the constant current source;
a first switch including a control terminal, a signal input port and a signal output port;
a second switch including a control terminal, a signal input port and a signal output port;
a voltage differential amplifier including a high potential input port, a low potential input port, and a signal output port; and
a time calculator for accumulating the time of the signal output from the voltage differential amplifier, comprising:
a first electrical contact forming the electrical connection with the signal output port of the voltage differential amplifier;
a second electrical contact and a third electrical contact forming the respective electrical connection with the first switching signal output port and second switching signal output port of the logic operation unit; and
a fourth electrical contact outputting the accumulated time to the logic operation unit in the form of electrical signal;
wherein the first constant current source through the first constant current source output electrical contact, and the second constant current source through the second constant current source output electrical contact are electrically connected to the signal input port of the first switch, the signal input port of the second switch, the first capacitive sensor, the second capacitive sensor, the low potential input port of the voltage differential amplifier, and the high potential input port of the voltage differential amplifier, respectively; and
wherein the other terminals of the switches and the capacitive sensors are connected to ground, resulting in the electrical connection of the first switch and the first capacitive sensor in parallel, and the electrical connection of the second switch and the second capacitive sensor in parallel.

12. The fluid measuring device as claimed in claim 11, wherein the first capacitive sensor and the second capacitive sensor have a specific size ratio providing a specific capacitance ratio.

13. The fluid measuring device as claimed in claim 12, wherein the amount of the current from the first constant current source and the second constant current source is set based on the specific capacitance ratio.

14. The fluid measuring device as claimed in claim 11, wherein:
in a initial state, each of the switching signal output ports of the logic operation unit outputs a logic high signal to turn on the signal input port and signal output port of each switch, thereby discharging the capacitive sensor; and
after a first stage in time, each of the switching signal output port of the logic operation unit outputs a signal to turn off the signal input port and signal output port of each switch, at the same time the switching signal output port of the logic operation unit outputs another signal to clear the accumulated time record in the time calculator to restart the time accumulation.

15. The fluid measuring device as claimed in claim 11, wherein:
the capacitance sensing circuit is in the first stage in time, the switching signal output port of the logic operation unit outputs a signal to turn off the signal input port and signal output port of the first switch, as well as the signal input port and signal output port of the second switch;
the logic operation unit clears the accumulated time record in the time calculator to restart the time accumulation, enabling the first capacitor and the second capacitor will be continuously charged and rise the voltage on the second electrical contact and the voltage on the third electrical contact;
after the second stage in time, the voltage on the second electrical contact and the voltage on the third electrical contact reaches saturation and results in the constant voltage difference between the second electrical contact and the third electrical contact, thereby the logic operation unit stops accumulating the time to obtain the time difference between the time at first stage and second stage; and
at the time when the logic operation unit stops accumulating the time, the logic operation unit calculates the capacitance of the second capacitor according to the time difference and the capacitance of the first capacitor.

16. The fluid measuring device as claimed in claim 11, wherein:
the logic operation unit further comprises performing a back stage algorithm on the capacitance of the second capacitor of the capacitive sensor to obtain at least one physical property of a body of fluid; and
the at least one physical property is selected from one of the concentration, density, and surface level of the body of fluid.

17. The fluid measuring device as claimed in claim 11, wherein the capacitance sensing circuit and the logic operation unit can be integrated in the form of either an electrical circuit or an integrated circuit (IC).

18. The fluid measuring device as claimed in claim 11, wherein:
   the voltage comparator is a voltage differential amplifier, and further comprises a first comparator, a second comparator, a first resistor, a second resistor, a third resistor, a fourth resistor, and a fifth resistor;
   the second electrical contact is electrically connected to the high potential port of the first comparator, the third electrical contact is electrically connected to the high potential port of the second comparator, the signal output port of the first comparator is electrically connected to the second electrical contact;
   the low potential port of the first comparator, the first resistor, and the low potential port of the second comparator are electrically connected in series; and
   one terminal of the second resistor is connected to ground and another terminal is electrically connected to the low potential port of the second comparator, one terminal of the third resistor is electrically connected to the low potential port of the second comparator and another terminal is electrically connected to the signal output port of the second comparator, one terminal of the fourth resistor is electrically connected to the signal output port of the second comparator and another terminal is electrically connected to the grounded low potential port of the first comparator, one terminal of the fifth resistor is electrically connected to the low potential port of the first comparator and another terminal is electrically connected to the signal output port of the first comparator.

19. The fluid measuring device as claimed in claim 11, wherein the voltage comparator is used to amplify the difference between the voltage on the second electrical contact and the voltage on the third electrical contact.

20. The fluid measuring device as claimed in claim 11, wherein the capacitance sensing circuit and the logic operation unit can be integrated in the form of either an electrical circuit or an integrated circuit (IC).

21. The fluid measuring device as claimed in claim 11, wherein:
   the first capacitor corresponds to an accommodation space, and the accommodation space is a locally enclosed space in a fluid fuel tank and does not store any fluid fuel;
   the second capacitor corresponds to the fluid fuel storage space in the fluid fuel tank; and
   the capacitance value from the first capacitor is a reference capacitance in the absence of fluid, and the second capacitor can use the measured capacitance from the first capacitor by proportion and set the resulting value as the initial capacitance in the absence of fluid.

22. The fluid measuring device as claimed in claim 11, wherein the logic operation unit converts the electrical signals from the capacitors into the surface level information of stored fluid fuel, and the surface level information of the stored fluid fuel can be further output as image data to be displayed on a display device.

23. The fluid measuring device as claimed in claim 22, wherein:
   the display device is a computer system, and the logic operation unit is electrically connected to a signal I/O port of the computer system; and
   the surface level information of the fluid fuel is sent to the computer system to be displayed as image or text format on the display device, in order to allow a user to monitor the remaining fluid fuel level of the fuel cell system.

* * * * *